United States Patent [19]

Eggebeen

[11] Patent Number: 5,092,537
[45] Date of Patent: Mar. 3, 1992

[54] SPRING-LOADED TAPE SPOOL FOR BELT-DRIVEN CARTRIDGE

[75] Inventor: James A. Eggebeen, San Diego, Calif.

[73] Assignee: Gigatek Memory Systems, La Costa, Calif.

[21] Appl. No.: 524,326

[22] Filed: May 16, 1990

Related U.S. Application Data

[63] Continuation-in-part of Ser. No. 417,460, Oct. 5, 1989, abandoned.

[51] Int. Cl.$^5$ .............. B65H 18/10; B65H 75/14; G11B 15/32
[52] U.S. Cl. .................. 242/199; 242/68.3; 242/71.8
[58] Field of Search ........... 242/68.3, 71.8, 197–200, 242/192; 360/132, 96.1

[56] References Cited

U.S. PATENT DOCUMENTS

| | | | |
|---|---|---|---|
| 1,121,231 | 12/1914 | Davis et al. | 242/55.18 |
| 2,928,620 | 3/1960 | Stavrakis et al. | 242/68.3 |
| 3,323,743 | 9/1965 | Landgraf | 242/71.8 X |
| 3,692,255 | 9/1972 | Von Behren | 242/192 |
| 4,244,535 | 1/1981 | Moodie | 242/71.8 |
| 4,289,282 | 9/1981 | Kohno | 242/71.8 |
| 4,352,469 | 10/1982 | Huck | 242/71.8 |
| 4,445,159 | 4/1984 | Nemoto et al. | 360/137 |
| 4,473,194 | 9/1984 | Kashimura | 242/71.8 |
| 4,523,727 | 6/1985 | Morioka | 242/192 |
| 4,561,609 | 12/1985 | Collins et al. | 242/199 X |
| 4,610,555 | 9/1986 | DiLuco | 242/71.8 X |
| 4,625,931 | 12/1986 | Tamura et al. | 242/68.3 |
| 4,640,473 | 2/1987 | Aoyama | 384/322 X |
| 4,706,149 | 11/1987 | Machida et al. | 242/199 X |
| 4,729,500 | 3/1988 | Gwon | 226/190 |
| 4,747,556 | 5/1988 | Tanaka et al. | 242/68.3 X |

Primary Examiner—John M. Jillions
Attorney, Agent, or Firm—Brown, Martin, Haller & McClain

[57] ABSTRACT

A tape spool for use in a magnetic tape cartridge which includes means for maintaining the spool at a predetermined height relative to the cartridge base in order to stabilize the tape path. The spool is adapted for mounting on and rotation relative to a cylindrical pin extending perpendicularly from a base toward an opposite wall, the base and wall defining opposite substantially parallel sides of an enclosure, the tape spool remaining a constant distance from the base and including: a hub having a central aperture for mounting on the pin, an upper surface, a lower bearing surface, and a circumferential tape supporting rim; a disc attached to the hub; a spring formed in the disc and in contact with the upper surface of the hub; and a central aperture for mounting on the pin; and a retaining member adjacent the upper portion of the disc, the spring urging the disc against the retaining member and simultaneously urging the hub downward such that the hub is retained at a constant distance from the base. A tape cartridge which uses the spools of this invention can be used in non-horizontal orientations and are effectively immune from temperature induced tape floating.

19 Claims, 3 Drawing Sheets

SPRING-LOADED TAPE SPOOL FOR BELT-DRIVEN CARTRIDGE

CROSS-REFERENCE TO RELATED APPLICATION

This application is a continuation-in-part of application Ser. No. 07/417,460, filed Oct. 5, 1989.

BACKGROUND OF THE INVENTION

1. Field of the Invention

The present invention relates to a tape spool or reel. More specifically, it relates to an improvement in tape spools to be assembled in belt-driven tape cartridges.

2. Description of the Prior Art

Computers which read and write data on magnetic tape require rapid acceleration and deceleration of the tape. The belt-driven tape cartridge described in U.S. Pat. No. 3,692,255 (Von Behren) has been found best suited to meet this requirement. However, it is not without its limitations.

The belt-driven tape cartridge, first marketed in 1972, was made to meet the density and speed requirements at that time. Since then, the original ¼ inch wide (6.35 mm), one mil thick (0.025 mm) tape, driven at 30 inches (762 mm) per second, has become available in widths from 0.150 inches (3.81 mm) to 0.250 inches (6.35 mm), is as thin as 0.6 mil (0.015 mm) and may be driven at 120 or more inches (3048 mm) per second. Data densities have increased by nearly an order of magnitude. The high density of data on the tape is made possible by multiple independent, parallel tracks spaced across the width of the tape. The higher tape speeds and densities have introduced the possibility of the tape drifting up or down with respect to the tape head, causing head-to-data-track misalignment. Spool positioning and stability is critical to maintaining the tape in a readable position. The tape, and therefore the spool, must be prevented from floating in relation to the base of the cartridge.

A non-oscillating spool is described in U.S. Pat. No. 4,523,727 (Morioka). The spool's oscillation is decreased or eliminated by biasing against the top of the cartridge housing using a "wear button" on the top of the spool and a spring incorporated in the upper flange of the spool. The spool is maintained at a constant distance relative to the top of the cartridge housing.

Due to different rates of thermal expansion of plastic materials of which the cartridge housing is usually made and the metal base, warpage can occur in the housing, causing deflection of the tape path. Since the base is the critical plane of reference, it is desirable to assure that the base is the point of reference from which the tape and spool are maintained at a constant distance. It is to this end that the present invention is directed.

SUMMARY OF THE INVENTION

A tape spool for use in a magnetic tape cartridge is described which includes means for maintaining the spool at a predetermined height relative to the cartridge base in order to stabilize the tape path.

According to the present invention, a tape spool is described which is adapted for mounting on and rotation relative to a cylindrical pin extending perpendicularly from a base toward an opposite wall, the base and wall defining opposite substantially parallel sides of an enclosure, the tape spool remaining a constant distance from the base and comprising: a hub having a central aperture for mounting on the pin, an upper surface, a lower bearing surface, and a circumferential tape supporting rim; a disc having an engaging means whereby the disc is attached to the hub; spring means formed in the disc and in contact with the upper surface of the hub; and a central aperture for mounting on the pin; and a retaining means adjacent the upper portion of the disc, the spring means comprising means for urging the disc against the retaining means and simultaneously urging the hub downward such that the hub is retained at a constant distance from the base.

The disc is joined to the hub preferably by way of pins or the like projecting downwardly from the lower portion of the disc. The pins engage in corresponding holes in the hub, causing the disc to be joined to the hub.

A tape cartridge will contain two such spools, a feeder and a take-up spool, to assure retention of the tape at a constant position with respect to the tape head.

DETAILED DESCRIPTION AND PREFERRED EMBODIMENTS

Figure 1:
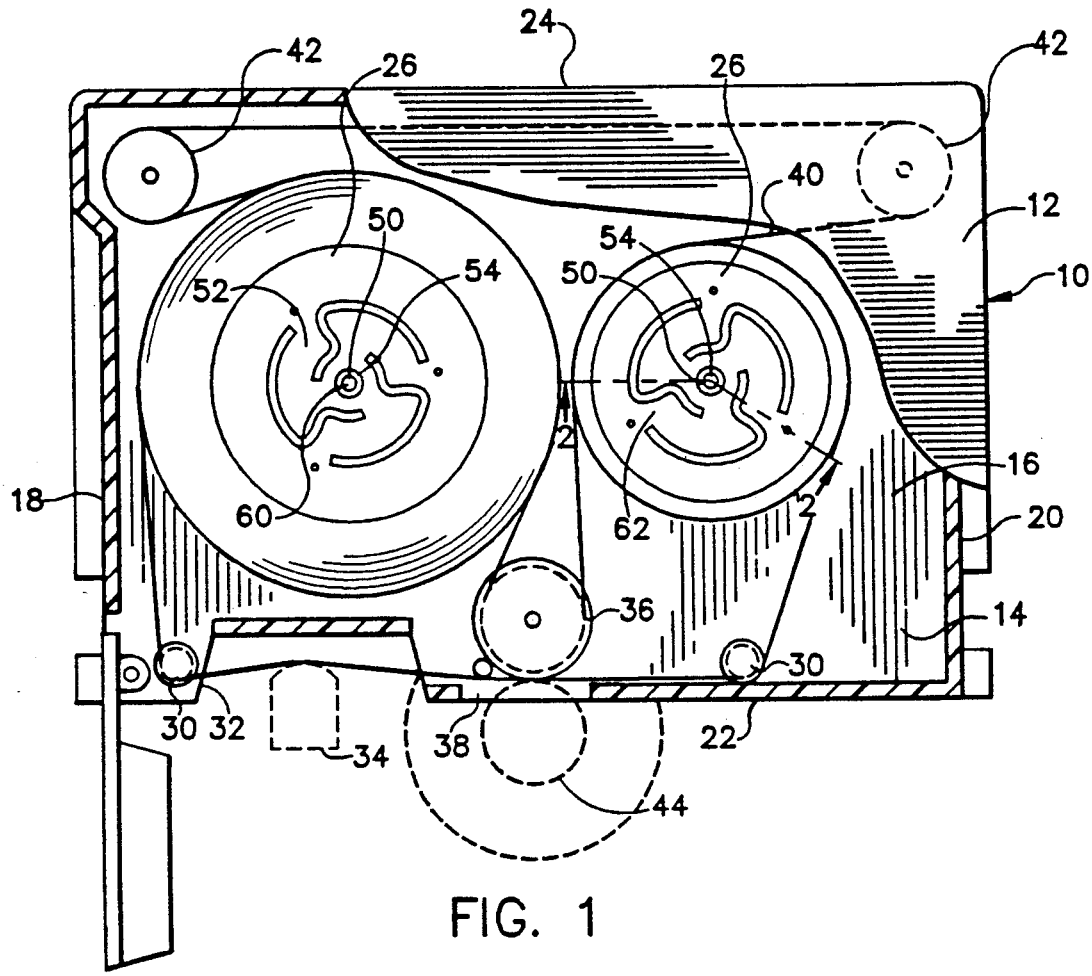
FIG. 1 is a plan view of a tape cartridge with the improved tape spools of the present invention.

FIG. 1 illustrates a data cartridge 10 having two of the improved tape spools according to a preferred embodiment of the present invention. The cartridge 10 includes an outer housing 12 for holding various internal tape guiding and transporting components. The housing includes a flat base 14, which is generally of metal such as aluminum and a flat cover member or top 16 of a transparent plastic material secured parallel to and at a predetermined spacing from the base to define the "top" and "bottom" of a generally rectangular enclosure. Opposite side walls 18 and 20 and front wall 22 and rear wall 24, each of which may be formed integrally with the base or cover member, complete the enclosure. In the preferred embodiment illustrated, the side, front and rear walls are all formed integrally with the cover member. (It will be apparent that the cartridge may be placed in a variety of different orientations, such that positions of the "base," "top," "side," etc. may be varied in space. However, those skilled in the art will recognize that the terminology used herein is for ease of description and to describe the orientation of the components of the device with respect to each other and with respect to the drawings, and not necessarily with respect to orientation relative to other devices with which the present cartridge may be used.)

A pair of tape spools 26 are rotatably supported on the base 14 by cylindrical pins 50 which are fixed into the base 14 perpendicular to the base and extending a distance that is less than that required to reach the cover or top 16. A magnetic recording tape is wound around the tape spools at opposite ends and extends between the tape spools along a predetermined path around various fitted tape guides 30. The path extends across an opening 32 in the front wall 22 of the cartridge to provide access for a tape head 34.

A tape drive mechanism is also mounted in the cartridge and comprises a belt driving roller 36 mounted adjacent a second opening 38 in the front wall of the housing. A drive belt 40 extends around the driving roller 36 and around belt guide rollers 42 rotatably mounted on a base at the rear corners of the housing so as to contact the tape wound on both spools 26 and frictionally drive the tape and spools. The driving roller 36 is driven via drive roller 44 through the opening 38 in the front wall of the housing.

One embodiment of the improved tape spool 26 is illustrated in FIGS. 2-5 and includes hub 62 on which is mounted at the lower peripheral edge thereof a radially extending flange 60; these may be formed as an integral unit. The spool 26 also includes a disc 64 positioned above the hub 62. Both hub 62 and disc 64 are mounted for rotation on pin 50. Retaining means 54 is mounted on the upper end of pin 50 to retain the spool and disc as explained below.

The hub 62 provides a cylindrical tape winding surface and is preferably molded of plastic. In the preferred embodiment, the hub 62 is formed with recesses around a core 56 through which bore 28 is provided, bore 28 being sized to closely but freely fit the diameter of cylindrical pin 50. To provide rigidity to the hub, a plurality of ribs (not shown) may radiate from core 56 to the inside wall of peripheral rim 65.

Figure 5:
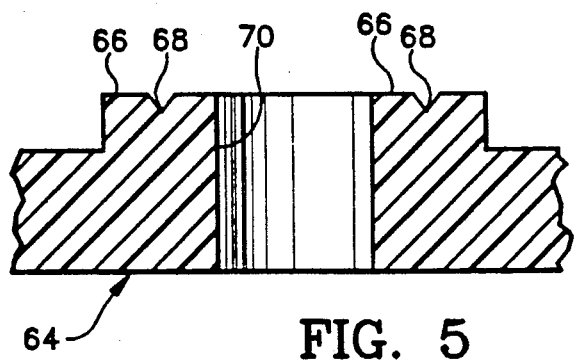
FIG. 5 is an expanded cross-sectional view taken on line 5—5 of FIG. 4.
Figure 6:
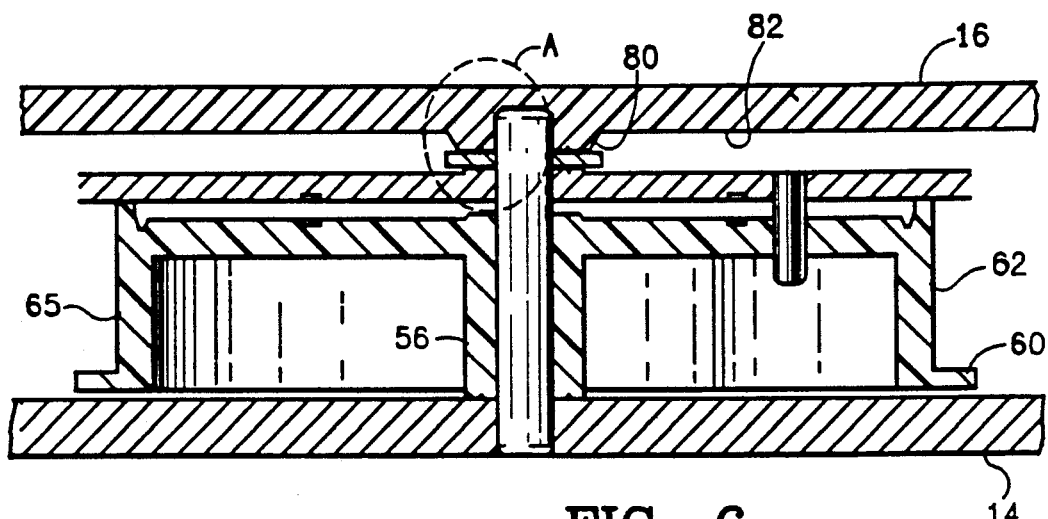
FIG. 6 is an expanded cross-sectional view similar to that of FIG. 2 and showing another embodiment of the invention.
Figure 7:
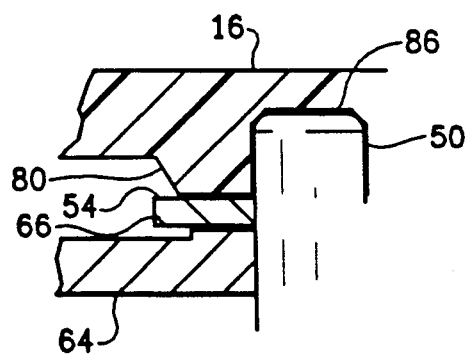
FIGS. 7, 8 and 9 are partial detail views showing different embodiments of the portion of the device encompassed by the circled area A of FIG. 6.
Figure 8:
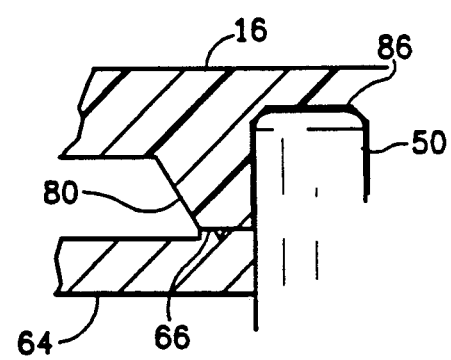

A lower portion of the core 56 extends a short distance below the lower flange 60 to provide a bearing surface 67 which is similar to the bearing surface 66 of the upper flange as illustrated in FIG. 5 The lower bearing surface 67 will be inverted relative to FIG. 5, so its grease groove 69 is on the lower surface. The thin bearing surface 67 abuts the base 14 and provides a reduced surface area of contact for rotation. To decrease friction further, the grease groove 69 is formed in the bearing surface 67 and into which a lubricant may be placed and held between the bearing surface 67 and base 14. The preferred lubricant is high viscosity mineral oil, with the general requirement being that the lubricant is clean and will not readily disperse oil particles beyond the bearing surface. The diameter of the bearing surface 67 will be a matter of choice: a large diameter bearing surface will increase stability of the spool, but an accompanying increase in friction will occur.

The disc 64 is preferably manufactured from polypropylene which is known for lubrication properties and resiliency. Other possible materials include fluorocarbon polymers (such as "Teflon" polymers) and other resilient plastics.

Engaging holes 57 are formed in the hub upper surface 55, the engaging holes 57 having a chamfered edge for ease of inserting the engaging means 58 of the disc 64.

The disc 64 has engaging means 58 extending downwardly from its lower surface which mate with the engaging holes 57 of the hub 62. The engaging means 58 are preferably pins or posts which are molded as an integral unit of the disc 64, which fasten to the hub 62 by an interference fit with the holes 57.

Bore 70 is formed in the disc 64 to closely but freely fit the diameter of cylindrical pin 50.

Figure 2:
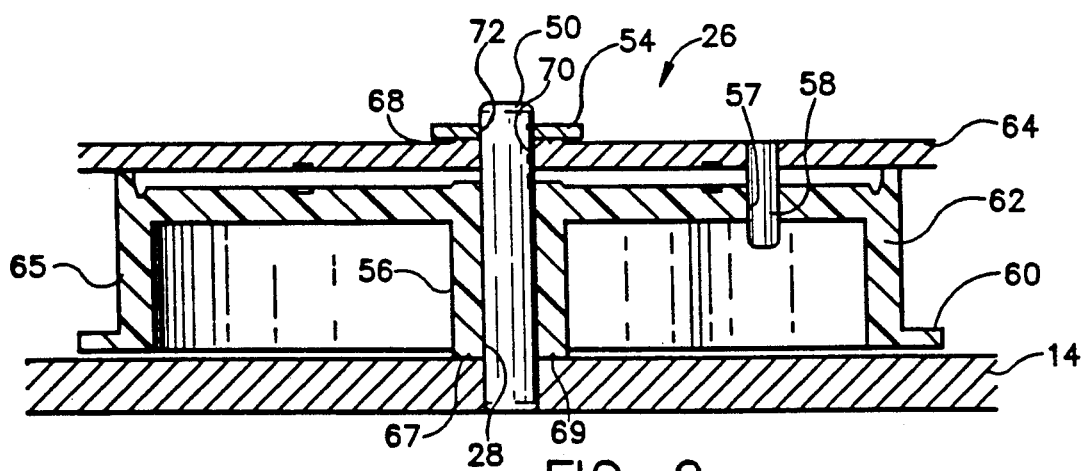
FIG. 2 is an expanded cross-sectional view taken on line 2—2 of FIG. 1.
Figure 3:
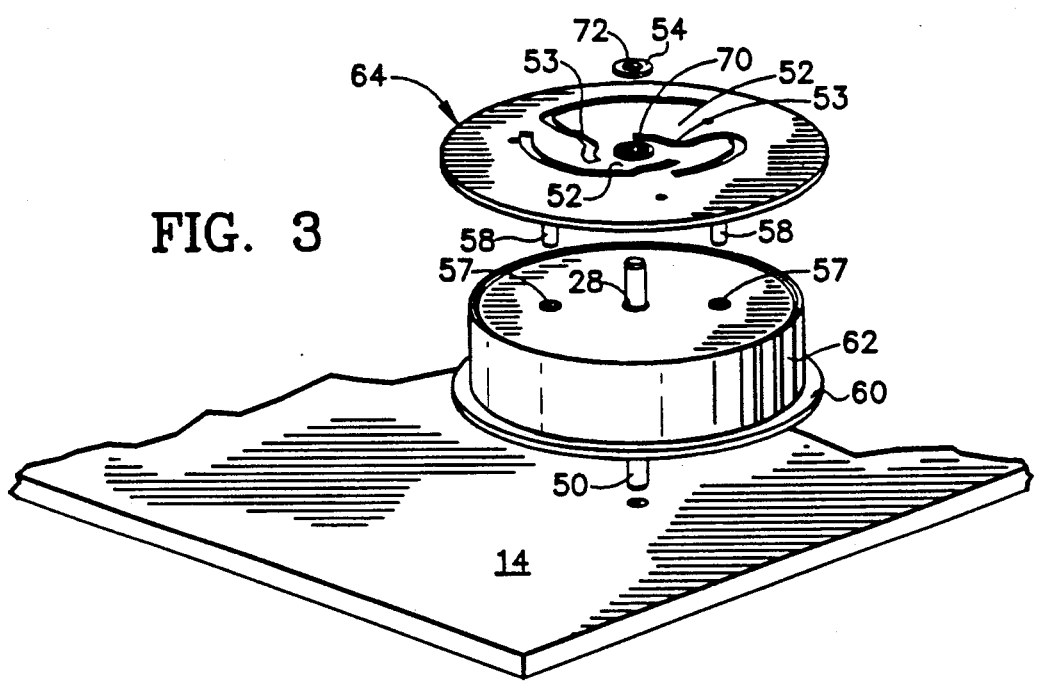
FIG. 3 is a perspective exploded view of the hub, the disc and the base.
Figure 4:
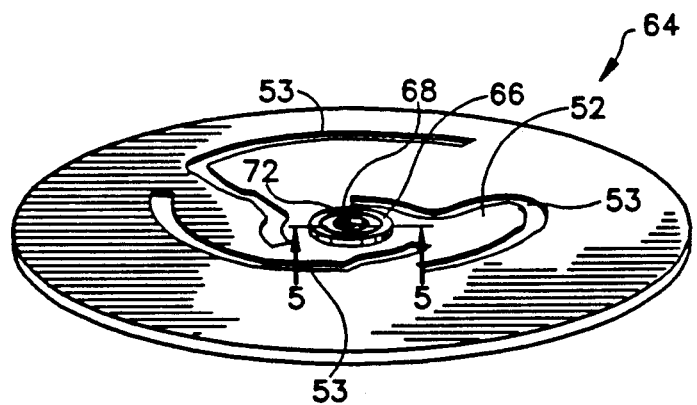
FIG. 4 is a perspective view of the upper surface of the disc showing the bearing surface, the springs and the lubrication groove.

To provide the means for biasing the spool assembly downward, a spring 52 is formed preferably in a flat helix with the spring effect imparted by segments formed by cuts 53 in the plate 64. Three cuts/spring segments are illustrated in FIGS. 3 and 4, but more or fewer may be used without altering the scope of the invention. The spring 52 need not be of a particular configuration—the spring could also be one or two cantilever springs which provide a means of biasing the spool assembly against retaining means 54. The spring 52 presses against the top surface of the hub 62 as shown in FIG. 2 and urges the hub 62 downward.

Retaining means 54 is preferably a retaining washer which is interference fit with the cylindrical pin 50 providing a fixed surface against which spring 52 is biased. Bore 72 of retaining means 54 is sized to closely fit the diameter of the cylindrical pin 50 so that retaining means 54 is permanently affixed to the cylindrical pin 50 after the spool assembly is in place.

The retaining means 54 may also be a washer with a set screw, or any other means of firmly attaching a biasing surface to cylindrical pin 50.

In FIGS. 4 and 5, the bearing surface 66 is shown on the upper portion of disc 64. Bearing surface 66 is formed in like manner as the bearing surface 67 on the hub 62, with a small contact area for reduced friction between the disc 64 and the retaining means 54. A grease groove 68, shown in FIG. 5, is cut to provide a recessed area for retaining lubricant, further reducing friction between the retaining means 54 and the bearing surface 66.

Figure 9:
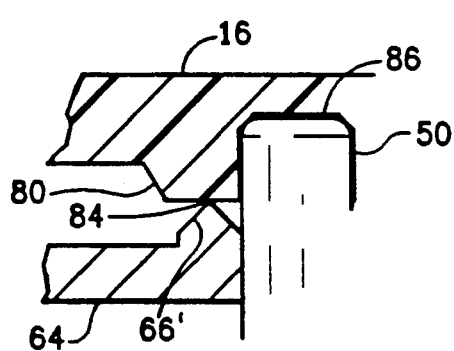

FIGS. 6-9 show alternative embodiments of the device in which the retention means is in the form of a boss 80 on the underside 82 of top 16 which bears against the bearing surface 66 of disc 64 (FIG. 8), the retaining washer 54 (FIG. 7) or a raised ridge 84 on surface 66' (FIG. 9). The top of pin 50 fits loosely into a central recess 86 in boss 80, which prevents thermal expansion of the cover from stressing the pin laterally or downwardly.

Because the present invention results in maintenance of the tape at a constant distance above the base of the cartridge (the base being the point of reference above which the spools and therefore the tape remain a constant distance), a tape cartridge which uses the spools herein described will prevent motion of the hub away from the base when the cartridge is operated in a non-horizontal orientation and also will provide effective immunity from temperature induced tape floating.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A tape spool adapted for mounting on and rotation relative to a cylindrical pin extending perpendicularly from a base toward an opposite wall, said base and wall defining opposite substantially parallel sides of an enclosure, said tape spool remaining a constant distance from said base and comprising:

a hub member having a central aperture for mounting on said pin, an upper surface, a lower bearing surface, and a circumferential tape supporting rim;

a disc member having an engaging means whereby said disc member is attached to said hub; spring means formed in said disc member and in contact with said upper surface of said hub; and a central aperture for mounting on said pin; and retaining means abutting the upper portion of said disc member, said spring means comprising means for urging said disc member against said retaining means and simultaneously urging said hub downward such that said hub is retained at a constant distance from said base.

2. A tape spool as in claim 1 wherein said bearing surface has a groove disposed therein whereby lubricant is held between said base and said bearing surface.

3. A tape spool as in claim 1 wherein said disc member has a groove disposed in the upper surface thereof and aligned with said retaining means whereby lubricant is held between said retaining means and said disc member.

4. A tape spool as in claim 1 wherein said spring means is in urging contact with said upper surface of said hub.

5. A tape spool as in claim 1 wherein said disc member has a plurality of said engaging means projecting downwardly therefrom and said hub has a plurality of corresponding engaging holes for receiving said engaging means, whereby said attachment of said disc member to said hub is accomplished when said engaging means are disposed in said engaging holes.

6. A tape spool as in claim 5 wherein said engaging means and said engaging holes are spaced equally radially from the center of said tape spool.

7. A tape spool as in claim 5 wherein said engaging means are pins projecting downwardly from said second flange and retained by interference fit in said engaging holes.

8. A tape spool as in claim 1 wherein said hub has a coaxial core extending downward from said upper surface of said hub, said circumferential tape supporting rim is in the form of a radially spaced coaxial annulus, and said core and said rim are joined by a plurality of radially extending ribs.

9. A tape spool as in claim 1 wherein said retaining means comprises a washer which is interference fitted onto said cylindrical pin.

10. A tape spool as in claim 1 wherein said retaining means comprises a boss projecting downwardly from the underside of said opposite wall.

11. A tape spool as in claim 10 wherein said boss maintains sliding contact with the upper surface of said disc.

12. A tape spool as in claim 10 wherein said boss maintains sliding contact with a projection on the upper surface of said disc.

13. A tape spool as in claim 1 wherein said retaining means comprises a washer which is interference fitted onto said cylindrical pin in combination with a boss projecting downwardly from the underside of said opposite wall against which said washer maintains sliding contact.

14. A tape spool as in claim 1 wherein said disc member is formed from polypropylene.

15. A tape spool as in claim 1 wherein said disc member is formed from fluorocarbon polymer.

16. A tape spool as in claim 2 wherein said lubricant is high viscosity mineral oil.

17. A tape spool adapted for mounting on and rotation relative to a cylindrical pin extending perpendicularly from a base toward an opposite wall, said base and said wall defining respective upper and lower substantially parallel sides of an enclosure, said tape spool remaining a constant distance from said base and comprising:

a retaining means adjacent the unattached end of said cylindrical pin;

a disc member, the upper surface of said disc member abutting said retaining means, a coaxial spring formed in said disc member to urge said disc member against said retaining means, an upper bearing surface on the outer portion of said disc member abutting said retaining means, an engaging means projecting downwardly from said disc member, and a central aperture for mounting said disc member on said pin;

a hub member having a upper surface therein, said upper surface having a plurality of engaging holes for receiving said engaging means whereby said disc member is attached to said hub, a central aperture for mounting said hub member on said pin, a lower bearing surface which abuts said base, and a circumferential tape supporting rim.

18. A tape spool adapted for mounting on and rotation relative to a cylindrical pin extending perpendicular from a base toward an opposite wall, said base and said wall defining respectively upper and lower substantially parallel sides of an enclosure, said tape spool remaining a constant distance from said base and comprising:

a hub comprising a cylinder of sufficient height to retain a magnetic tape, having an upper surface with a plurality of engaging holes, a circumferential upper bearing surface extending upwardly from the periphery of said upper surface, a lower perimeter having a lower flange, and a lower bearing surface;

a disc member having engaging means projecting downwardly from the lower surface thereof whereby said disc member is in biasing contact with said hub at said circumferential upper bearing surface and is attached to said hub when said engaging means are disposed in said engaging holes, bearing means on the upper surface thereof, and coaxial spring means formed therein; and a retaining means abutting the upper portion of said disc member, said spring means urging against said retaining means whereby said disc member urges said hub downwardly through said contact at said circumferential upper bearing surface to maintain said hub at a constant distance from said base.

19. A tape cartridge comprising:

an outer housing having parallel and spaced apart base and top and peripheral side walls joined to said base and top and therewith defining an enclosure;

a pair of tape spool assemblies for supporting a tape for rotation in opposite directions on spaced parallel axes perpendicular to said base and top;

each spool assembly comprising a support pin extending perpendicularly from said base toward said top and a tape spool for providing a winding surface for a tape rotatably mounted on said support pin, said spool having raising upwardly from the periphery of the upper surface thereof a circumferential bearing surface;

each support pin having a spool retainer member mounted on it at a location adjacent to said top, and biasing means between said retainer member and said circumferential bearing surface of said tape spool for urging said spool against said base.

* * * * *